United States Patent
Briskin (10) Patent No.: US 6,721,117 B2
(45) Date of Patent: Apr. 13, 2004

(54) READ/WRITE SYSTEM WITH REDUCED WRITE-TO-READ TRANSITION RECOVERY TIME INDEPENDENT FROM INPUT VOLTAGE AND INPUT CURRENT OFFSET

(75) Inventor: Boris Briskin, Vadnais Heights, MN (US)

(73) Assignee: Agere Systems Inc., Allentown, PA (US)

( * ) Notice: Subject to any disclaimer, the term of this patent is extended or adjusted under 35 U.S.C. 154(b) by 394 days.

(21) Appl. No.: 09/725,441

(22) Filed: Nov. 29, 2000

(65) Prior Publication Data

US 2002/0063987 A1 May 30, 2002

(51) Int. Cl.[7] .................................................. G11B 5/09
(52) U.S. Cl. ............................ 360/66; 360/67; 360/46
(58) Field of Search .............................. 360/46, 66, 67, 360/31, 25; 330/9, 252, 259, 260, 269, 270, 290, 85

(56) References Cited

U.S. PATENT DOCUMENTS

| | | | | |
|---|---|---|---|---|
| 3,988,689 A | * | 10/1976 | Ochi et al. ..................... 330/9 |
| 5,508,656 A | * | 4/1996 | Jaffard et al. ................... 330/9 |
| 5,945,853 A | * | 8/1999 | Sano ............................ 327/87 |
| 6,049,246 A | * | 4/2000 | Kozisek et al. ................. 330/9 |
| 6,111,711 A | * | 8/2000 | Barber et al. .................. 360/46 |
| 6,313,704 B1 | * | 11/2001 | Maruyama et al. ......... 330/259 |
| 6,404,578 B1 | * | 6/2002 | Bhandari et al. ............. 360/61 |

* cited by examiner

*Primary Examiner*—David Hudspeth
*Assistant Examiner*—Varsha A Kapadia
(74) *Attorney, Agent, or Firm*—Kinney & Lange, P.A.

(57) ABSTRACT

A read/write system for reading information from a magnetic storage medium using a magnetoresistive head and for providing an output signal representative of the information read includes a differential pair circuit, an input voltage offset compensation circuit, and an input current offset compensation circuit. The differential pair circuit is ac coupled to first and second input signal nodes and includes first and second transistors, first and second load resistors, and a current generator. The input voltage offset compensation circuit is coupled to the differential pair circuit and includes a switch network and a Gm stage. The input current offset compensation circuit is coupled to the differential pair circuit and includes an integrator circuit and first and second biasing resistors.

33 Claims, 4 Drawing Sheets

READ/WRITE SYSTEM WITH REDUCED WRITE-TO-READ TRANSITION RECOVERY TIME INDEPENDENT FROM INPUT VOLTAGE AND INPUT CURRENT OFFSET

BACKGROUND OF THE INVENTION

The present invention relates to a read/write system for reading information from a magnetic storage medium using a magnetoresistive head and for providing an output signal representative of the information read. In particular, the present invention relates to a read/write system with reduced write-to-read transition recovery time and increased input impedance.

A popular method of magnetic data storage utilizes magnetoresistive (MR) heads to store and recover data on a magnetic data storage medium such as a magnetic disk. An MR head employs an MR element that changes in resistivity with changing magnetic flux from data patterns on an adjacent magnetic disk surface. A bias current having a constant value is passed through the MR element, and the change in resistivity is measured by sensing the change in voltage across the MR head.

Amplifier circuits that sense signals from MR heads commonly include differential inputs and differential outputs. While there are a wide variety of differential amplifier circuit topologies, most include an input stage with a current source, two load resistors, and symmetrical transistors for splitting the current between the load resistors. Usually, the output voltage is taken as the difference in the voltage drops across the load resistors; in this manner, large variations in output voltages may be achieved with extremely small input voltage differentials. Additionally, differential amplifier circuits commonly include an input stage that is capacitively (or ac) coupled to the MR head; in this manner, only changes in input voltage are sensed by the differential amplifier circuit, while dc voltages are ignored.

For all differential amplifier read/write circuits there are associated therewith certain transition recovery time performance characteristics. These characteristics and others determine the usefulness of the read/write circuit in any given application. The write-to-read transition recovery time is the duration of time required for a differential amplifier read/write circuit to switch from write mode to read mode and reach steady state. For differential amplifier read/write circuits that are capacitively coupled to the MR head, the write-to-read transition recovery time is increased due to charging and discharging of the input capacitors. This is caused by the presence of input voltage and input current offset.

Theoretically, if the transistors, as well as the load resistors, in a differential amplifier circuit were perfectly matched and the voltage across the differential inputs was zero, then current would split equally between the transistors and the output voltage would also be zero. Practical circuits, however, exhibit mismatches that result in a nonzero dc output voltage even when the voltage across the inputs is zero. As a result, in order to reduce the output voltage to zero, an input voltage offset must be present between the inputs of the differential amplifier circuit. In addition, in a perfectly matched differential amplifier circuit, the differential inputs carry equal dc currents, otherwise known as input bias currents. Practical circuits, however, exhibit mismatches, particularly in the P of the transistors, that make the input dc currents unequal. The resulting difference is the input current offset.

One well-known modification to the differential amplifier read/write circuit is the addition of a Gm stage, or transconductance amplifier, that is coupled to the transistors of the input stage. The Gm stage provides negative shunt feedback which causes a shunting of the noise resistances of the input transistors and suppresses disturbances caused by the input voltage offset during the transition from write mode to read mode. However, the main disadvantage of this type of circuit is that the negative shunt feedback only compensates the input voltage offset and not the input current offset. Furthermore, because the Gm stage provides negative shunt feedback not only during the transition from write mode to read mode but at all times, the amount of feedback is a tradeoff between write-to-read transition recovery time and input impedance of the differential amplifier read/write circuit. An increase in the transconductance of the Gm stage suppresses disturbances caused by the input voltage offset more quickly and decreases the write-to-read transition recovery time. However, an increase in the transconductance of the Gm stage is equivalent to a decrease in the resistance of the Gm stage. Because the resistance of the Gm stage is directly in parallel to the small-signal model resistances of the input transistors, the input impedance of the differential amplifier circuit decreases, which in turn requires a significant increase in the size of the input capacitors.

Accordingly, there is a need for a read/write system that compensates both input voltage offset and input current offset to reduce write-to-read transition recovery time, while increasing input impedance to reduce the size of the input capacitors.

BRIEF SUMMARY OF THE INVENTION

The present invention is a read/write system for reading information from a magnetic storage medium using a magnetoresistive head and for providing an output signal representative of the information read. A differential pair circuit is ac coupled to first and second input signal nodes and includes first and second transistors, first and second load resistors, and a current generator. An input voltage offset compensation circuit is coupled to the differential pair circuit and includes a switch network and a Gm stage. An input current offset compensation circuit is coupled to the differential pair circuit and includes an integrator circuit and first and second biasing resistors.

DETAILED DESCRIPTION

Figure 1:
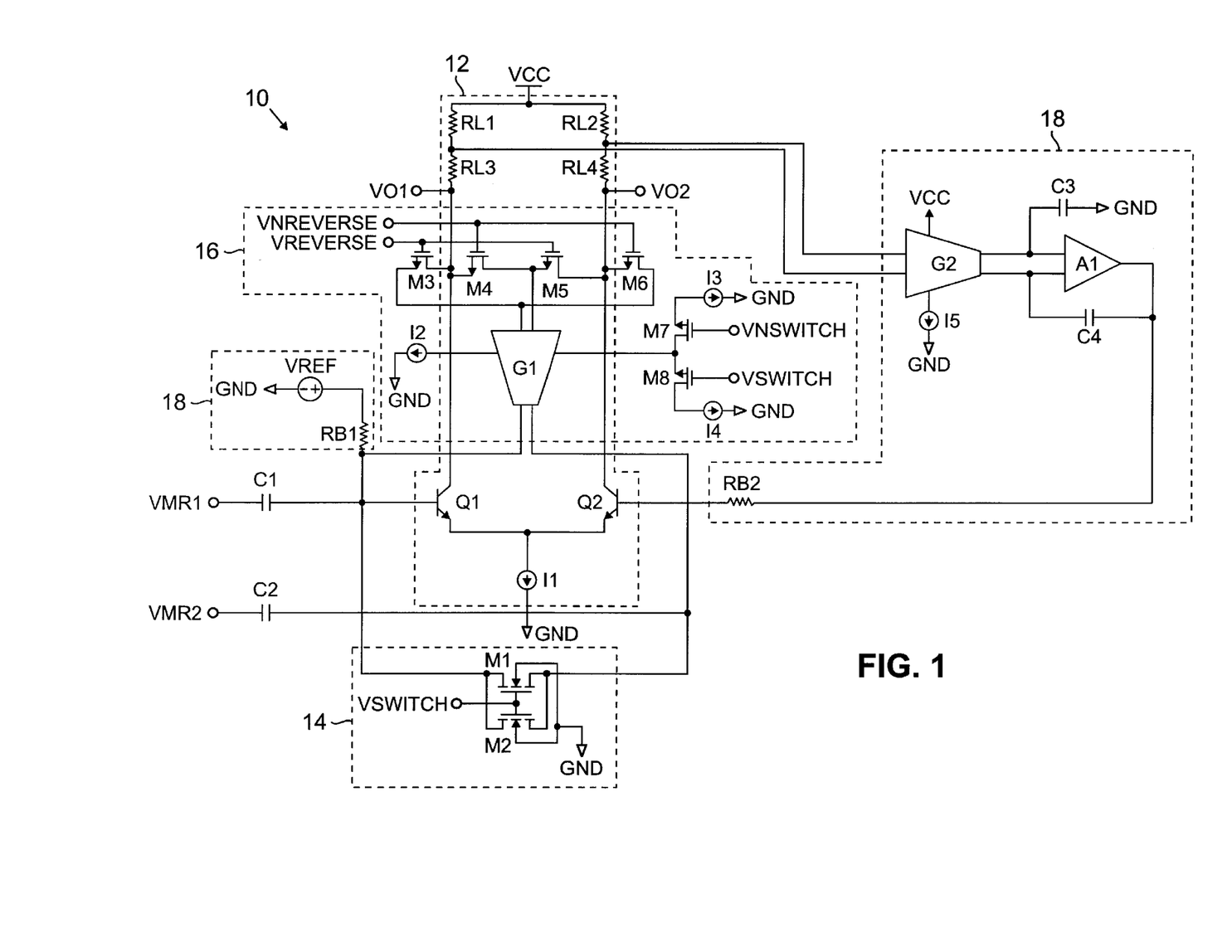
FIG. 1 shows a circuit schematic diagram of a first embodiment of the present invention.

FIG. 1 is a circuit diagram of a first embodiment of a read/write system 10 of the present invention. Read/write system 10 includes a differential pair circuit 12, a switching circuit 14, an input voltage offset compensation circuit 16, an input current offset compensation circuit 18, input signal nodes VMR1 and VMR2, capacitors C1 and C2, output signal nodes VO1 and VO2, and fixed potentials VCC and GND.

Differential pair circuit 12 includes transistors Q1 and Q2, load resistors RL1–RL4, and current generator I1. Transistors Q1 and Q2 are npn bipolar junction transistors each having a base, a collector, and an emitter. Load resistors RL1 and RL3 are connected in series between fixed potential VCC and the collector of transistor Q1. Load resistors RL2 and RL4 are connected in series between fixed potential VCC and the collector of transistor Q2. The base of transistor Q1 is connected to input signal node VMR1 through capacitor C1. The base of transistor Q2 is connected to input signal node VMR2 through capacitor C2. The emitter of transistor Q1 is connected to the emitter of transistor Q2. Current generator I1 is connected between the emitter of transistor Q1 and fixed potential GND. Output signal nodes VO1 and VO2 are connected respectively to load resistors RL1 and RL2.

Switching circuit 14 includes transistors M1 and M2, and control signal node VSWITCH. Transistors M1 and M2 are NMOS transistors each having a gate, a source, a drain, and a substrate. Control signal node VSWITCH is connected to the gates of transistors M1 and M2. The drain of transistor M1 and the source of transistor M2 are each connected to the base of transistor Q1. The source of transistor M1 and the drain of transistor M2 are each connected to the base of transistor Q2. The substrates of transistors M1 and M2 are each connected to fixed potential GND.

Input voltage offset compensation circuit 16 includes transistors M3–M8, Gm stage G1, current generators I2–I4, and control signal nodes VREVERSE and VNREVERSE. Transistors M3–M8 are NMOS transistors each having a gate, a source, a drain, and a substrate, wherein the substrate is connected to the source. Transistors M3–M6, along with control signal nodes VREVERSE and VNREVERSE, form a switch network for selectively switching the configuration of input voltage offset compensation circuit 16 between positive shunt feedback and negative shunt feedback. Transistors M7 and M8, along with control signal nodes VNSWITCH and VSWITCH, control the biasing current to Gm stage G1 by selectively switching between current generators I3 and I4. Gm stage G1 is a transconductance amplifier having first and second input nodes, first and second output nodes, and first and second biasing current nodes. Gm stage G1 not only provides resistances between its input nodes and output nodes, but it also provides a differential current at its output nodes that is proportional to the differential voltage at its input nodes. Control signal node VREVERSE is connected to the gates of transistors M3 and M5. Control signal node VNREVERSE is connected to the gates of transistors M4 and M6. Control signal node VNSWITCH is connected to the gate of transistor M7, and control signal node VSWITCH is connected to the gate of transistor M8. The drain of transistor M3 and the source of transistor M4 are each connected to the collector of transistor Q1. The drain of transistor M5 and the source of transistor M6 are each connected to the collector of transistor Q2. The source of transistor M3 and the drain of transistor M6 are each connected to the first input node of Gm stage G1. The drain of transistor M4 and the source of transistor M5 are each connected to the second input node of Gm stage G1. The first output node of Gm stage G1 is connected to the base of transistor Q1, and the second output node of Gm stage G1 is connected to the base of transistor Q2. Current generator I2 is connected between the first biasing current node of Gm stage G1 and fixed potential GND. The drain of transistor M7 and the source of transistor M8 are each connected to the second biasing current node of Gm stage G1. Current generator I4 provides a significantly greater current than current generator I3, and is connected between the source of transistor M8 and fixed potential GND. Current generator I3 is connected between the drain of transistor M7 and fixed potential GND.

Input current offset compensation circuit 18 includes Gm stage G2, current generator 15, operational amplifier A1, capacitors C3 and C4, biasing resistors RB1 and RB2, and reference voltage VREF. Gm stage G2 is a transconductance amplifier having first and second input nodes, first and second output nodes, and first and second biasing current nodes. Operational amplifier A1 has first and second input nodes, and an output node. The first and second input nodes of Gm stage G2 are connected respectively to load resistors RL2 and RL1. The first and second output nodes of Gm stage G2 are connected respectively to the first and second input nodes of operational amplifier A1. The first biasing current node of Gm stage G2 is connected to fixed potential VCC. Current generator 15 is connected between the second biasing current node of Gm stage G2 and fixed potential GND. Capacitor C3 is connected between the first input node of operational amplifier A1 and fixed potential GND. Capacitor C4 is connected between the second input node and the output node of operational amplifier A1. The output node of operational amplifier A1 is connected to the base of transistor Q2 through biasing resistor RB2. Reference voltage VREF is connected to the base of transistor Q1 through biasing resistor RB1.

In operation, the voltage across an MR head is the signal that is retrieved from a data pattern on an adjacent magnetic disk surface. This voltage across the MR head is represented in FIG. 1 at input signal nodes VMR1 and VMR2. During read mode when the voltage at control signal node VSWITCH is low, the voltage difference between input signal nodes VMR1 and VMR2 is the input signal that is sensed by read/write system 10. Variations in the voltage difference between input signal nodes VMR1 and VMR2 lead to variations in the currents through transistors Q1 and Q2. These variations in currents lead to voltage variations across load resistors RL1–RL4, which in turn lead to variations in the voltage difference between output signal nodes VO1 and VO2.

Input voltage offset compensation circuit 16 is operable to reduce write-to-read transition recovery time by compensating for input voltage offset in the time period immediately following a write-to-read transition. This compensation is performed by connecting the read/write system in a negative shunt feedback configuration in the time period following the write-to-read transition to suppress disturbances caused by input voltage offset, while connecting the read/write system in a positive shunt feedback configuration at all other times so that the system has a desirable high input impedance. Input current offset compensation circuit 18 is operable to reduce write-to-read transition recovery time by compensating for input current offset in the currents conducted through differential pair circuit 12. This compensation is performed by providing a negative dc feedback configuration utilizing an integrator to equalize the voltages at output signal nodes VO1 and VO2 of the read/write system.

Although input voltage offset compensation circuit 16 and input current offset compensation circuit 18 operate simultaneously within read/write system 10, each circuit operates independently from the other circuit, and each circuit can exist alone in a separate read/write system. Therefore, to more easily explain the operation of each circuit, input voltage offset compensation circuit 16 is isolated in a read/write system shown in FIG. 2, and input current offset compensation circuit 18 is isolated in a read/write system shown in FIG. 4.

Figure 2:
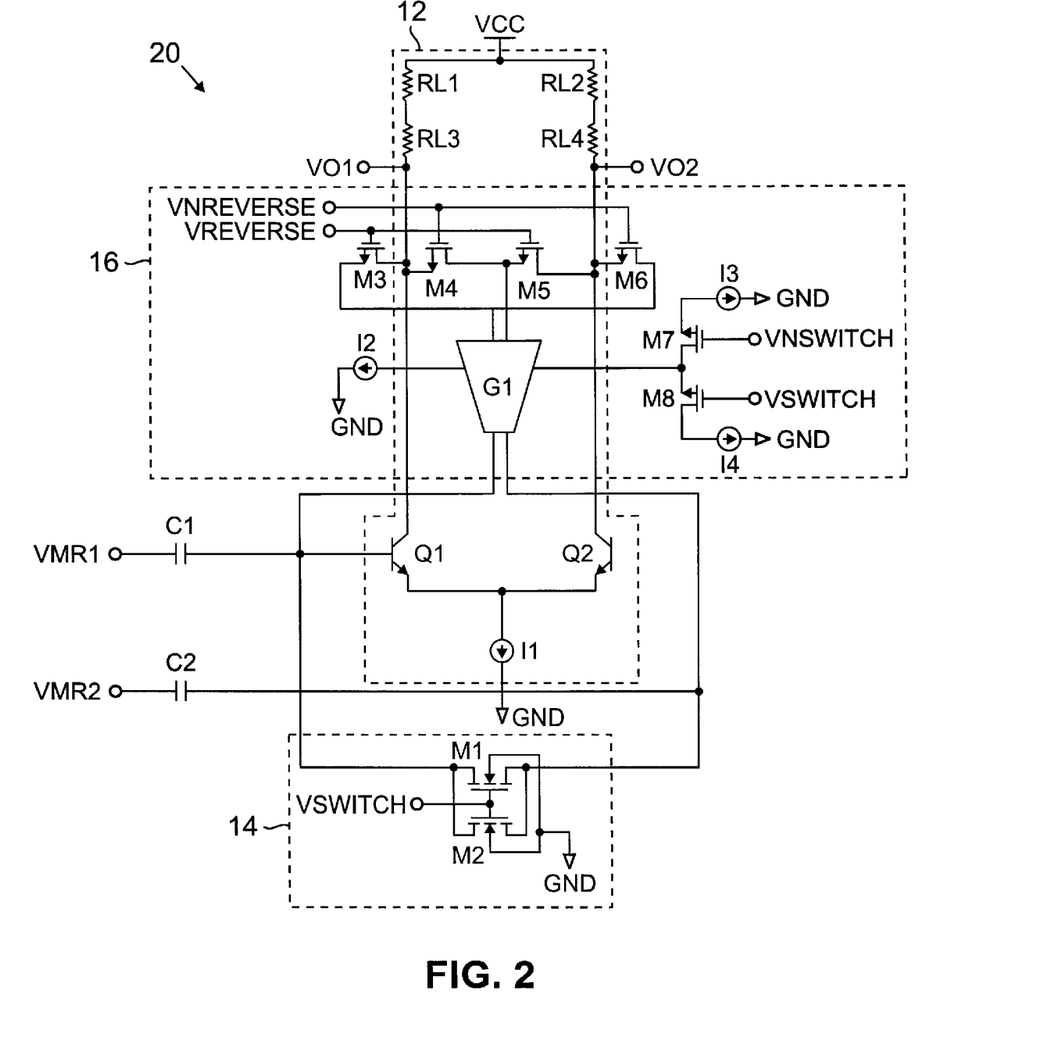
FIG. 2 shows a circuit schematic diagram of a second embodiment of the present invention.
Figure 3A:
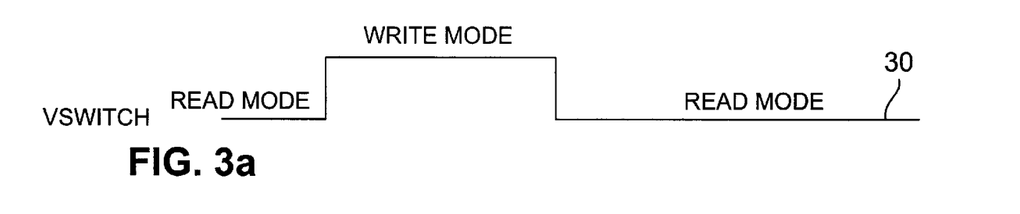
FIG. 3 shows a timing diagram of the second embodiment of the present invention.
Figure 3B:
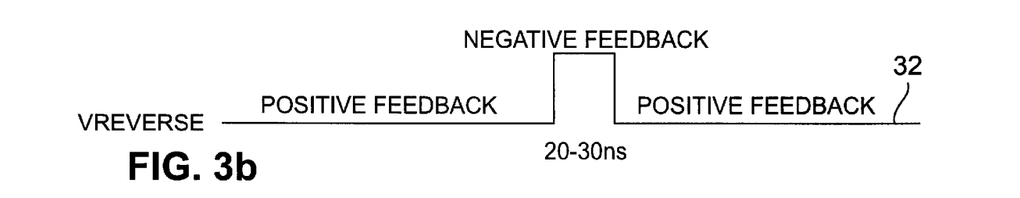
Figure 3C:
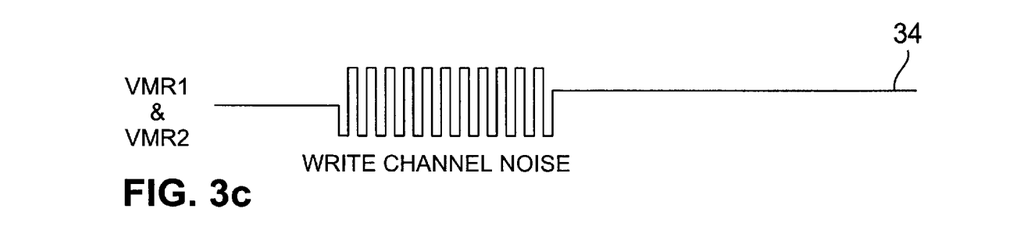
Figure 3D:
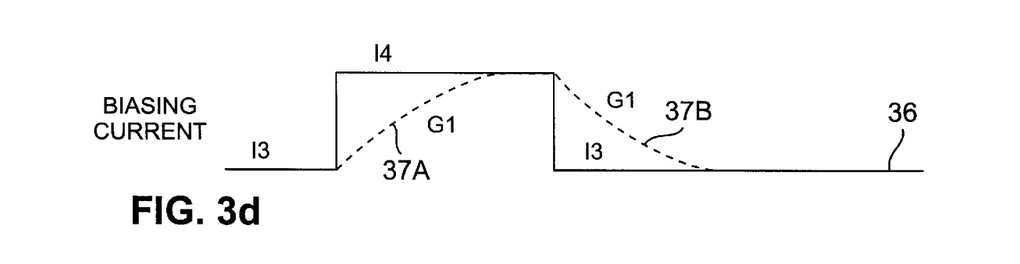
Figure 3E:
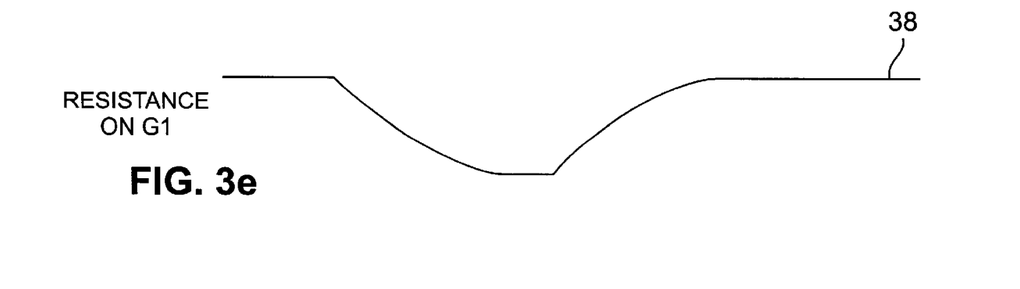

FIG. 2 is a circuit diagram of an input voltage offset compensation portion of read/write system 20 of the present invention. Read/write system 20 includes a differential pair circuit 12, a switching circuit 14, an input voltage offset compensation circuit 16, input signal nodes VMR1 and VMR2, capacitors C1 and C2, output signal nodes VO1 and VO2, and fixed potentials VCC and GND.

When the voltage at control signal node VSWITCH is low, transistors M1 and M2 are turned off and read/write system 20 is in read mode. During the steady state in read mode, the voltage at control signal node VNREVERSE is high and the voltage at control signal node VREVERSE is low, causing transistors M4 and M6 to be turned on, and transistors M3 and M5 to be turned off. As a result, the collector of transistor Q1 is connected to the second input node of Gm stage G1 through active transistor M4 and the collector of transistor Q2 is connected to the first input node of Gm stage G1 through active transistor M6. Since the voltage at control signal node VSWITCH is low and the voltage at control signal node VNSWITCH (which is the inverse of VSWITCH) is high, transistor M7 is turned on and transistor M8 is turned off, so that the second biasing current node of Gm stage G1 is connected to current generator I3 through active transistor M7. In this configuration, input voltage offset compensation circuit 16 provides positive shunt feedback; resistances are provided by Gm stage G1 between the collector of transistor Q1 and the base of transistor Q2, and between the collector of transistor Q2 and the base of transistor Q1. These resistances are large because the small biasing current provided by current generator I3 causes the transconductance of Gm stage G1 to be low (transconductance is inversely proportional to resistance). The large resistances in this positive shunt feedback configuration provided by Gm stage G1, combined with the fact that these large resistances are not directly in parallel with the small-signal model resistances of transistors Q1 and Q2, increase the input impedance of differential pair circuit 12, and allows the size of capacitors C1 and C2 to be significantly reduced.

When the voltage at control signal node VSWITCH is changed to high, read/write system 20 is in write mode and transistors M1 and M2 are turned on. As a result, the bases of transistors Q1 and Q2 are connected to each other through active transistors M1 and M2. Because the bases of transistors Q1 and Q2 are shorted, differential pair circuit 12 is not affected by the noise pulses that are induced from input signal nodes VMR1 and VMR2 during write mode. The voltages at control signal nodes VNREVERSE and VREVERSE are unchanged during write mode, and remain high and low respectively. Since the voltage at control signal node VSWITCH is high and the voltage at control signal node VNSWITCH is low, transistor M8 is turned on and transistor M7 is turned off, so that the second biasing current node of Gm stage G1 is connected to current generator I4 through active transistor M7. As a result, the biasing current through Gm stage G1 gradually increases (due to the capacitance associated with Gm stage G1) until the biasing current through Gm stage G1 reaches the same level as the current supplied by current generator I4. The resistance of Gm stage G1 decreases in a corresponding manner, since resistance is inversely proportional to biasing current and transconductance.

When the voltage at control signal node VSWITCH is again changed to low, transistors M1 and M2 are turned off and read/write system 20 is in read mode. At the same time the voltage at control signal node VSWITCH is changed to low, the voltage at control signal node VREVERSE is temporarily changed to high and the voltage at control signal node VNREVERSE is temporarily changed to low, causing transistors M3 and M5 to be turned on, and transistors M4 and M6 to be turned off. As a result, the collector of transistor Q1 is connected to the first input node of Gm stage G1 through active transistor M3 and the collector of transistor Q2 is connected to the second input node of Gm stage G1 through active transistor M5. Since the voltage at control signal node VNSWITCH is high and the voltage at control signal node VSWITCH is low, transistor M7 is turned on and transistor M8 is turned off, so that the second biasing current node of Gm stage G1 is connected to current generator I3 through active transistor M7. In this configuration, input voltage offset compensation circuit 16 provides negative shunt feedback for the temporary time period while the voltage at control signal node VREVERSE is high; resistances are provided by Gm stage G1 between the collector and base of transistor Q1, and between the collector and base of transistor Q2. The current through Gm stage G1 gradually decays from the higher current value supplied by current generator I4 to the lower current value supplied by current generator I3, which causes the transconductance of Gm stage G1 to gradually decrease and the resistance of Gm stage G1 to gradually increase (transconductance is inversely proportional to resistance). Although the resistance of Gm stage G1 gradually increases from a low value to a steady state high value, the resistance of Gm stage G1 is generally lower during the temporary time period while the voltage at control signal node VREVERSE is high (negative feedback) than during the remaining time periods when the voltage at control signal node VREVERSE is low. This negative shunt feedback provided by Gm stage G1 provides small resistances directly in parallel to the small-signal model resistances of transistors Q1 and Q2, which suppresses the disturbances caused by the input voltage offset and the noise from input signal nodes VMR1 and VMR2. In addition, because Gm stage G1 is a transconductance amplifier, it equalizes the variations in voltage at the collectors of transistors Q1 and Q2 (or respectively the first and second input nodes of Gm stage G1) with changes in current at the bases of transistors Q1 and Q2 (or respectively the first and second output nodes of Gm stage G1). Then after approximately 25 ns when the steady state is reached, the voltage at control signal node VNREVERSE is changed back to high and the voltage at control signal node VREVERSE is changed back to low, causing transistors M4 and M6 to be turned on, and transistors M3 and M5 to be turned off. As a result, input voltage offset compensation circuit 16 again provides positive shunt feedback. Because the resistances provided by Gm stage G1 have gradually become large at this time, and not connected directly in parallel with the small-signal resistances of transistors Q1 and Q2, the input impedance of differential pair circuit 12 is again significantly increased.

Therefore, the input voltage offset compensation portion of the present invention provides a read/write system that reduces write-to-read transition recovery time by compensating input voltage offset during the write-to-read transition time, while increasing the input impedance of the differential amplifier circuit for the remainder of the time.

FIG. 3 is a timing diagram of the input voltage offset compensation portion of read/write system 20 of the present invention. Waveform 30 illustrates the voltage at control signal node VSWITCH. Waveform 32 illustrates the voltage at control signal node VREVERSE, which is the inverse of the voltage at control signal node VNREVERSE. Waveform 34 illustrates the voltage disturbances and noise pulses at input signal nodes VMR1 and VMR2. Waveform 36 illustrates the biasing current supplied to Gm stage G1, with curves 37A and 37B specifically illustrating the gradual increase and decrease of the biasing current through Gm stage G1 as a result of switching of the biasing current supplied to Gm stage G1. Waveform 38 illustrates the resistance of Gm stage G1.

Waveform 30 shows that when the voltage at VSWITCH is high, read/write system 20 is in write mode. When the voltage at VSWITCH is low, read/write system 20 is in read mode.

Waveform 32 shows that when read/write system 20 is in write mode, the voltage at VREVERSE is low and input voltage offset compensation circuit 26 provides positive shunt feedback. At the instant read/write system 20 switches to read mode, the voltage at VREVERSE is temporarily high and input voltage offset compensation circuit 26 provides negative shunt feedback. After approximately 25 ns–30 ns, the voltage at VREVERSE is changed back to low and input voltage offset compensation circuit 26 provides positive shunt feedback for the remainder of the read mode.

Waveform 34 shows that when read/write system 20 is in write mode, input signal nodes VMR1 and VMR2 experience voltage disturbances and write channel noise. When read/write system 20 switches to read mode, input voltage offset compensation circuit 26 eliminates any voltage disturbances and noise pulses at input signal nodes VMR1 and VMR2.

Waveform 36 illustrates the relative levels of biasing currents provided to Gm stage G1 by current generators 13 and 14. A small biasing current is supplied to Gm stage G1 by current generator 13 when VSWITCH is low and read/write system 20 is in read mode, and a large biasing current is supplied to Gm stage G1 by current generator I4 when VSWTICH is high and read/write system 20 is in write mode. Due to the capacitance associated with Gm stage G1, the biasing current through Gm stage G1 gradually increases when the biasing current supplied to Gm stage G1 switches from the low current value supplied by current generator I3 to the high current value supplied by current generator I4, as illustrated by curve 37A. For the same reason, the biasing current through Gm stage G1 also gradually decays when the biasing current supplied to Gm stage G1 switches from the high current value supplied by current generator 14 to the low current value supplied by current generator 13, as illustrated by curve 37B.

Waveform 38 illustrates the resistance of Gm stage G1, which is generally inversely proportional to the biasing current through Gm stage G1. As a result, the resistance of Gm stage G1 is generally higher during the steady state period of the read mode when VREVERSE is low and read/write system 20 is connected in a positive feedback configuration than in the period of the read mode when VREVERSE is high and read/write system 20 is connected in a negative feedback configuration.

Figure 4:
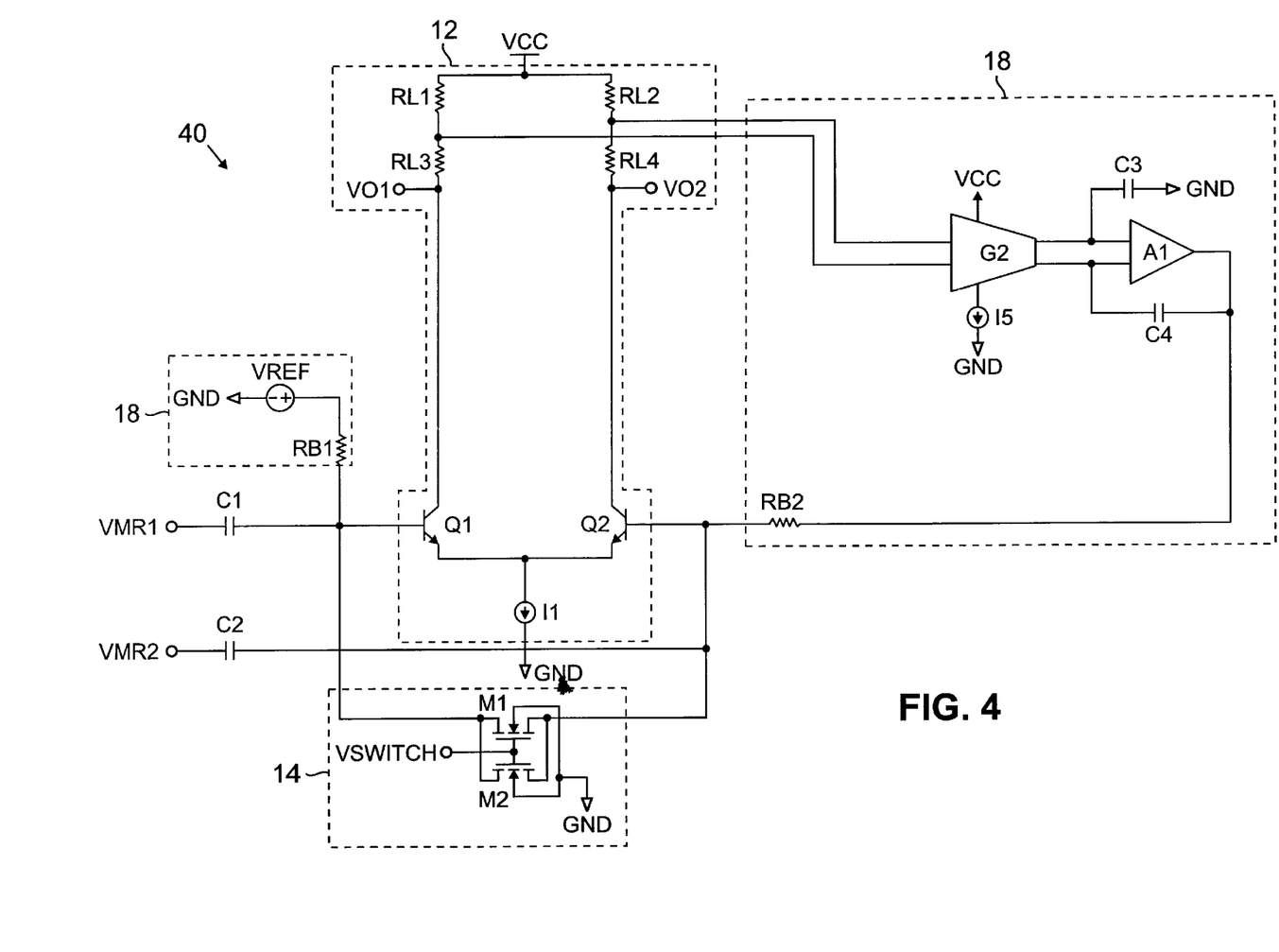
FIG. 4 shows a circuit schematic diagram of a third embodiment of the present invention.

FIG. 4 is a circuit diagram of an input current offset compensation portion of read/write system 40 of the present invention. Read/write system 40 includes a differential pair circuit 12, a switching circuit 14, an input current offset compensation circuit 18, input signal nodes VMR1 and VMR2, capacitors C1 and C2, output signal nodes VO1 and VO2, and fixed potentials VCC and GND.

In an initial situation with the voltage at control signal node VSWITCH low and read/write system 40 in read mode, before the voltage at control signal node VSWITCH begins switching between low and high voltages causing read/write system 40 to switch between read and write modes, the voltages at output signal nodes VO1 and VO2 are equalized by input current offset compensation circuit 18. Load resistors RL2 and RL1 are connected respectively to the first and second input nodes of Gm stage G2 (load resistors RL3 and RL4 separate the first and second input nodes of Gm stage G2 from output signal nodes VO1 and VO2 to eliminate influence from input current offset compensation circuit 18 on output frequency response of differential pair circuit 12). Gm stage G2 has a relatively long time constant of approximately 1 ms, and thus it responds only to signals having frequencies below approximately 1 kHz. As a result, Gm stage G2 effectively provides a dc path through which dc current can flow. Operational amplifier A1 and capacitors C3 and C4 form an integrator circuit where the voltage at the output node of operational amplifier A1 is the integral of the differential voltage at the input nodes of operational amplifier A1. This output voltage is applied to biasing resistor RB2, while reference voltage VREF is applied to biasing resistor RB1 to provide a common mode reference for differential pair transistors Q1 and Q2. Therefore, if a differential voltage is detected between the first and second input nodes of Gm stage G2, the integral of the differential voltage is continually applied to the base of transistor Q2 through resistor RB2 until there is no longer a differential voltage between the first and second input nodes of Gm stage G2. In this manner, input current offset compensation circuit 18 provides negative dc feedback and eventually equalizes the voltages at output signal nodes VO1 and VO2. Due to this feedback, input current offset is compensated for and does not impact write-to-read transition recovery time.

When the voltage at control signal node VSWITCH is subsequently switched between low and high voltages causing read/write system 40 to switch between read and write modes, input current offset compensation circuit 18 continues to maintain the same negative dc feedback prior to the switching. This is because the voltage signals at input signal nodes VMR1 and VMR2 during read mode are approximately in the frequency range 1 MHz to 1 GHz, well above the 1 kHz frequency response of Gm stage G2. Therefore, the operation of differential pair circuit 12 is not interfered with; input current offset compensation circuit 18 only compensates the internal current offset of differential pair circuit 12.

Therefore, the input current offset compensation portion of the present invention provides a read/write system that reduces write-to-read transition recovery time by compensating input current offset.

Thus, the present invention provides a read/write system that compensates both input voltage offset and input current offset to reduce write-to-read transition recovery time, while increasing input impedance to reduce the size of the input capacitors.

Although the present invention has been described with reference to preferred embodiments, workers skilled in the art will recognize that changes may be made in form and detail without departing from the spirit and scope of the invention.

What is claimed is:

1. A read/write system for reading information from a magnetic storage medium using a magnetoresistive head and for providing an output signal representative of the information read, the read/write system comprising:

first and second input signal nodes for connection to the magnetoresistive head;

a differential pair circuit ac coupled to the first and second input signal nodes, the differential pair circuit having first and second transistors; and an input voltage offset compensation circuit coupled to the differential pair circuit, the input voltage offset compensation circuit including a feedback selector for selectively connecting the differential pair circuit in a first feedback mode during a write-to-read transition time and a second feedback mode during the remainder of the time.

2. The read/write system of claim 1 wherein the first and second feedback modes are respectively negative shunt feedback and positive shunt feedback.

3. The read/write system of claim 1 wherein the input voltage offset compensation circuit comprises:

a switch network having first and second input nodes, first and second output nodes, and at least one control signal node, wherein the first and second input nodes are connected respectively to the collectors of the first and second transistors; and a Gm stage having first and second input nodes, and first and second output nodes, wherein the first and second input nodes are connected respectively to the first and second output nodes of the switch network, and the first and second output nodes are connected respectively to the bases of the first and second transistors.

4. The read/write system of claim 3, wherein the Gm stage further includes first and second biasing current nodes and the at least one control signal node includes a first control signal node and a second control signal node, and further comprising:

a first current generator connected to the first biasing current node of the Gm stage;

a first transistor connected between the first control signal node and the second biasing current node of the Gm stage; and a second transistor connected between the second control signal node and the second biasing current node of the Gm stage.

5. The read/write system of claim 4, wherein:

the first transistor has a gate, a source and a drain, the gate being connected to the first control signal node, the drain being connected through a second current generator to a fixed potential, and the source being connected to the second biasing current node of the Gm stage;

the second transistor has a gate, a source and a drain, the gate being connected to the second control signal node, the drain being connected through a third current generator to the fixed potential, and the source being connected to the second biasing current node of the Gm stage.

6. The read/write system of claim 3 wherein the switch network comprises:

a first transistor having a gate, a source, a drain, and a substrate, wherein the gate is connected to the control signal node, the drain is connected to the first input node, the source is connected to the first output node, and the substrate is connected to the source;

a second transistor having a gate, a source, a drain, and a substrate, wherein the gate is connected to the control signal node, the source is connected to the first input node, the drain is connected to the second output node, and the substrate is connected to the source;

a third transistor having a gate, a source, a drain, and a substrate, wherein the gate is connected to the control signal node, the drain is connected to the second input node, the source is connected to the second output node, and the substrate is connected to the source; and a fourth transistor having a gate, a source, a drain, and a substrate, wherein the gate is connected to the control signal node, the source is connected to the second input node, the drain is connected to the first output node, and the substrate is connected to the source.

7. The read/write system of claim 1 wherein the differential pair circuit is ac coupled to the first and second input signal nodes through first and second capacitors respectively.

8. The read/write system of claim 7 wherein the differential pair circuit comprises:

first and second transistors, each having a base, a collector, and an emitter, wherein the bases of the first and second transistors are connected respectively to the first and second capacitors, and the emitter of the first transistor is connected to the emitter of the second transistor;

first and second resistors coupled respectively between a first potential and the collectors of the first and second transistors; and a current generator for directing current through the first and second transistors.

9. The read/write system of claim 1 further comprising:

an input current offset compensation circuit coupled to the differential pair circuit for selectively adjusting a current therethrough.

10. The read/write system of claim 9 wherein the input current offset compensation circuit comprises:

an integrator circuit having first and second input nodes and an output node, wherein the first and second input nodes are connected respectively to the collectors of the first and second transistors; and first and second biasing resistors, wherein the first biasing resistor is connected between a reference potential and the base of the first transistor, and the second biasing resistor is connected between the output of the integrator circuit and the base of the second transistor.

11. The read/write system of claim 10 wherein the integrator circuit comprises:

a Gm stage having first and second input nodes, and first and second output nodes, wherein the first and second input nodes are connected respectively to the first and second input nodes of the integrator circuit;

an operational amplifier having first and second input nodes, and an output node, wherein the first and second input nodes are connected respectively to the first and second output nodes of the Gm stage; and first and second capacitors, wherein the first capacitor is connected between the first input node of the operational amplifier and a second potential, and the second capacitor is connected between the second input node and the output node of the operational amplifier.

12. A read/write system having a read mode and a write mode for use with a magnetic storage medium, the read/write system comprising:

first and second input signal nodes for connection to a magnetoresistive head;

a differential pair circuit ac coupled to the first and second input signal nodes, the differential pair circuit having first and second transistors;

a switching circuit for switching the read/write system between the read and write modes; and an input voltage offset compensation circuit coupled to the differential pair the input voltage offset compensation circuit including a feedback selector for selectively connecting the differential pair circuit in first and second feedback modes in response to transitions between the read and write modes.

13. The read/write system of claim 12 wherein the first and second feedback modes are respectively negative shunt feedback and positive shunt feedback.

14. The read/write system of claim 12 wherein the input voltage offset compensation circuit comprises:

a switch network having first and second input nodes, first and second output nodes, and at least one control signal node, wherein the first and second input nodes are connected respectively to the collectors of the first and second transistors; and a Gm stage having first and second input nodes, and first and second output nodes, wherein the first and second input nodes are connected respectively to the first and second output nodes of the switch network, and the first and second output nodes are connected respectively to the bases of the first and second transistors.

15. The read/write system of claim 14, wherein the Gm stage further includes first and second biasing current nodes and the at least one control signal node includes a first control signal node and a second control signal node, and further comprising:

a first current generator connected to the first biasing current node of the Gm stage;

a first transistor connected between the first control signal node and the second biasing current node of the Gm stage; and a second transistor connected between the second control signal node and the second biasing current node of the Gm stage.

16. The read/write system of claim 15, wherein:

the first transistor has a gate, a source and a drain, the gate being connected to the first control signal node, the drain being connected through a second current generator to a fixed potential, and the source being connected to the second biasing current node of the Gm stage; and the second transistor has a gate, a source and a drain, the gate being connected to the second control signal node, the drain being connected through a third current generator to the fixed potential, and the source being connected to the second biasing current node of the Gm stage.

17. The read/write system of claim 16 wherein the switch network comprises:

a first transistor having a gate, a source, a drain, and a substrate, wherein the gate is connected to the control signal node, the drain is connected to the first input node, the source is connected to the first output node, and the substrate is connected to the source;

a second transistor having a gate, a source, a drain, and a substrate, wherein the gate is connected to the control signal node, the source is connected to the first input node, the drain is connected to the second output node, and the substrate is connected to the source;

a third transistor having a gate, a source, a drain, and a substrate, wherein the gate is connected to the control signal node, the drain is connected to the second input node, the source is connected to the second output node, and the substrate is connected to the source; and a fourth transistor having a gate, a source, a drain, and a substrate, wherein the gate is connected to the control signal node, the source is connected to the second input node, the drain is connected to the first output node, and the substrate is connected to the source.

18. The read/write system of claim 12 wherein the differential pair circuit is ac coupled to the first and second input signal nodes through first and second capacitors respectively.

19. The read/write system of claim 18 wherein the differential pair circuit comprises:

first and second transistors, each having a base, a collector, and an emitter, wherein the bases of the first and second transistors are connected respectively to the first and second capacitors, and the emitter of the first transistor is connected to the emitter of the second transistor;

first and second resistors coupled respectively between a first potential and the collectors of the first and second transistors; and a current generator for directing current through the first and second transistors.

20. A read/write system for reading information from a magnetic storage medium using a magnetoresistive head and for providing an output signal representative of the information read, the read/write system comprising:

first and second input signal nodes for connection to the magnetoresistive head;

first and second transistors, each having a base, a collector, and an emitter, wherein the emitter of the first transistor is connected to the emitter of the second transistor;

first and second capacitors, wherein the first capacitor is connected between the first input signal node and the base of the first transistor, and the second capacitor is connected between the second input signal node and the base of the second transistor;

first and second resistors, wherein the first resistor is coupled between a first potential and the collector of the first transistor, and the second resistor is coupled between the first potential and the collector of the second transistor;

a current generator for directing current through the first and second transistors; and an input voltage offset compensation circuit coupled between the base and the collector of the first and second transistors, the input voltage offset compensation circuit comprising:

a switch network having first and second input nodes, first and second output nodes, and first and second control signal nodes, wherein the first and second input nodes are connected respectively to the collectors of the first and second transistors; and a first Gm stage having first and second input nodes and first and second output nodes, wherein the first and second input nodes are connected respectively to the first and second output nodes of the switch network, and the first and second output nodes are connected respectively to the bases of the first and second transistors.

21. The read/write system of claim 20 wherein the switch network comprises:

a third transistor having a gate, a source, a drain, and a substrate, wherein the gate is connected to the first control signal node, the drain is connected to the first input node, the source is connected to the first output node, and the substrate is connected to the source;

a fourth transistor having a gate, a source, a drain, and a substrate, wherein the gate is connected to the second control signal node, the source is connected to the first input node, the drain is connected to the second output node, and the substrate is connected to the source;

a fifth transistor having a gate, a source, a drain, and a substrate, wherein the gate is connected to the first control signal node, the drain is connected to the second input node, the source is connected to the second output node, and the substrate is connected to the source; and a sixth transistor having a gate, a source, a drain, and a substrate, wherein the gate is connected to the second control signal node, the source is connected to the second input node, the drain is connected to the first output node, and the substrate is connected to the source.

22. The read/write system of claim 21, wherein the first Gm stage further includes first and second biasing current nodes, and further comprising:

a second current generator connected to the first biasing current node of the first Gm stage;

a seventh transistor connected between the first control signal node and the second biasing current node of the first Gm stage; and an eighth transistor connected between the second control signal node and the second biasing current node of the first Gm stage.

23. The read/write system of claim 22, wherein:

the seventh transistor has a gate, a source and a drain, the gate being connected to the first control signal node, the drain being connected through a third current generator to a second potential, and the source being connected to the second biasing current node of the first Gm stage; and the eighth transistor has a gate, a source and a drain, the gate being connected to the second control signal node, the drain being connected through a fourth current generator to the second potential, and the source being connected to the second biasing current node of the first Gm stage.

24. The read/write system of claim 20 further comprising:

an input current offset compensation circuit coupled to the first and second transistors for selectively adjusting a current therethrough, the input current offset compensation circuit comprising:

an integrator circuit having first and second input nodes and an output node, wherein the first and second input nodes are connected respectively to the first and second resistors, and are connected respectively through third and fourth resistors to the first potential; and first and second biasing resistors, wherein the first biasing resistor is connected between a reference potential and the base of the first transistor, and the second biasing resistor is connected between the output node of the integrator circuit and the base of the second transistor.

25. The read/write system of claim 24 wherein the integrator circuit comprises:

a second Gm stage having first and second input nodes, and first and second output nodes, wherein the first and second input nodes are connected respectively to the first and second input nodes of the integrator circuit;

an operational amplifier having first and second input nodes, and an output node, wherein the first and second input nodes are connected respectively to the first and second output nodes of the second Gm stage; and third and fourth capacitors, wherein the third capacitor is connected between the first input node of the operational amplifier and a second potential, and the fourth capacitor is connected between the second input node and the output node of the operational amplifier.

26. A read system for reading information from a magnetic storage medium using a magnetoresistive head and for providing an output signal representative of the information read, the read system comprising:

first and second input signal nodes for connection to the magnetoresistive head;

a differential pair circuit ac coupled to the first and second input signal nodes, the differential pair circuit having first and second transistors; and an input current offset compensation circuit coupled to the differential pair circuit for selectively adjusting a current to one of the first and second transistors, wherein the input current offset compensation circuit comprises:

an integrator circuit having first and second input nodes and an output node, wherein the first and second input nodes are coupled to the differential pair circuit; and first and second biasing resistors, wherein the first biasing resistor is connected between a reference potential and the differential pair circuit, and the second biasing resistor is connected between the output of the integrator circuit and the differential pair circuit.

27. The read system of claim 26 wherein the integrator circuit comprises:

a Gm stage having first and second input nodes, and first and second output nodes, wherein the first and second input nodes are connected respectively to the first and second input nodes of the integrator circuit;

an operational amplifier having first and second input nodes, and an output node, wherein the first and second input nodes are connected respectively to the first and second output nodes of the Gm stage; and first and second capacitors, wherein the first capacitor is connected between the first input node of the operational amplifier and a fixed potential, and the second capacitor is connected between the second input node and the output node of the operational amplifier.

28. The read system of claim 26 wherein the differential pair circuit is ac coupled to the first and second input signal nodes through first and second capacitors respectively.

29. The read system of claim 28 wherein the differential pair circuit comprises:

first and second transistors, each having a base, a collector, and an emitter, wherein the bases of the first and second transistors are connected respectively to the first and second capacitors, and the emitter of the first transistor is connected to the emitter of the second transistor;

first and second collector resistors coupled respectively to the collectors of the first and second transistors; and a current generator for directing current through the first and second transistors.

30. A read system for reading information from a magnetic storage medium using a magnetoresistive head and for providing an output signal representative of the information read, the read system comprising:

first and second input signal nodes for connection to the magnetoresistive head;

first and second transistors, each having a base, a collector, and an emitter, wherein the emitter of the first transistor is connected to the emitter of the second transistor;

first and second input capacitors, wherein the first input capacitor is connected between the first input signal node and the base of the first transistor, and the second input capacitor is connected between the second input signal node and the base of the second transistor;

first and second resistors, wherein the first resistor is connected between a first potential and the collector of the first transistor, and the second resistor is connected between the first potential and the collector of the second transistor;

a current generator for directing current through the first and second transistors; and an input current offset compensation circuit coupled to the first and second transistors for selectively adjusting a current to one of the first and second transistors, wherein the input current offset compensation circuit comprises:

an integrator circuit having first and second input nodes and an output node, wherein the first and second input nodes are connected respectively to the first and third load resistors; and first and second biasing resistors, wherein the first biasing resistor is connected between a reference potential and the base of the first transistor, and the second biasing resistor is connected between the output node of the integrator circuit and the base of the second transistor.

31. The read system of claim 30 wherein the integrator circuit comprises:

a Gm stage having first and second input nodes, and first and second output nodes, wherein the first and second input nodes are connected respectively to the first and second input nodes of the integrator circuit;

an operational amplifier having first and second input nodes, and an output node, wherein the first and second input nodes are connected respectively to the first and second output nodes of the Gm stage; and first and second capacitors, wherein the first capacitor is connected between the first input node of the operational amplifier and a second potential, and the second capacitor is connected between the second input node and the output node of the operational amplifier.

32. A read/write system for reading information from a magnetic storage medium using a magnetoresistive head and for providing an output signal representative of the information read, the read/write system comprising:

first and second input signal nodes for connection to the magnetoresistive head;

a differential pair circuit ac coupled to the first and second input signal nodes, the differential pair circuit having first and second transistors;

an input voltage offset compensation circuit coupled to the differential pair circuit, the input voltage offset compensation circuit including a feedback selector for selectively connecting the differential pair circuit in a first feedback mode during a write-to-read transition time and a second feedback mode during the remainder of the time; and an input current offset compensation circuit coupled to the differential pair circuit for selectively adjusting a current to one of the first and second transistors.

33. A read/write system for reading information from a magnetic storage medium, the read/write system comprising:

a magnetoresistive head for writing information to the magnetic storage medium and reading information from the magnetic storage medium;

read/write circuitry coupled to the magnetoresistive head for providing an output signal representative of the information read; and offset compensation circuitry coupled to the read/write circuitry for compensating both input voltage offset and input current offset in the read/write circuitry while increasing input impedance of the read/write circuitry.

* * * * *